United States Patent [19]

Humpert et al.

[11] 3,880,183

[45] Apr. 29, 1975

[54] MIXING AND RESERVING VALVE ASSEMBLY

[75] Inventors: Jurgen Bruno Humpert; Karl-Heinz Nolting, both of Hemer, Germany

[73] Assignee: Friedrich Grohe Aramturenfabrik, Hemer, Germany

[22] Filed: May 16, 1974

[21] Appl. No.: 470,406

[52] U.S. Cl. ................................. 137/359; 4/192
[51] Int. Cl. ............................................. F16k 1/02
[58] Field of Search ........ 137/359, 360; 4/191, 192, 4/148

[56] References Cited
UNITED STATES PATENTS
2,507,467  5/1950  Fredrickson et al................. 137/359

Primary Examiner—Henry T. Klinksiek
Attorney, Agent, or Firm—Thomas L. Peterson

[57] ABSTRACT

A mixing and reversing valve assembly for use in a bath and shower combination including a concealed water connection fitting mounting behind a wall surface and a surface mounted flow fitting. The flow fitting is attached to the concealed connection fitting through a apertured cylindrical plug member. The connection fitting includes hot and water inlet ports and a third mixed water return port. The plug member is connected to the water return port by a hollow screw which forms a part of the water return passage. A flow reversing valve is mounted on the flow fitting for controlling the flow of water therethrough.

6 Claims, 5 Drawing Figures

MIXING AND RESERVING VALVE ASSEMBLY

BACKGROUND OF THE INVENTION

The present invention relates generally to a mixing and reversing valve assembly and, more particularly, to such an assembly for use in bath and shower combinations or the like.

The invention is particularly concerned with connecting a surface mounted flow fitting to a concealed water connection fitting mounted behind a wall surface. The invention provides for the return of mixed water through the concealed water connection fitting to a further consumer, such as a shower head.

For connecting a surface mounted flow fitting to a concealed water connection fitting, it is conventional practice to screw a cylindrical fitting piece with an O-ring seal into the connection fitting for slipping on the flow fitting. So far as mixing faucets are concerned, the two supply connections for cold and hot water are normally retained in a molded piece that insures proper spacing. A combination screw/plug connection is typically used for the surface mounted flow fitting to be connected to the water connection fitting so that a cylindrical bushing in the connection fitting leading to the first water connection serves as a plug connection for a corresponding plug for the flow fitting while an outer annular chamber leading to a second connection is connected up by screwing in a concentric, tubular faucet connection. The threaded connection is sealed by means of hemp.

It is the purpose of the present invention to provide a concealed connection fitting with a water outlet port which permits the return of mixed water through the fitting to a consumer.

SUMMARY OF THE INVENTION

According to the principal aspect of the present invention, there is provided a mixing and reversing valve assembly for use in a bath and shower combination or the like comprising a concealed water connection fitting which is adapted to be mounted behind a wall surface. The fitting includes separate chambers having inlets thereto for connection to hot and cold water supplies. The water connection fitting also includes a third port, for mixed return water. One wall of the fitting embodies a pair of outlet openings each communicating with one of the chambers in the connection fitting and a third opening communicating with the outlet port for the mixed return water. A cylindrical surface mountable plug member is attached to the water connection fitting adjacent to the aforementioned wall. The plug member contains three passages which are aligned with the openings in the wall for providing flow communication therewith. A flow fitting, such as a tub faucet, having a sleeve portion with a bore therein slidably receiving the plug member. A flow reversing valve is provided in the flow fitting. Passages are provided in the inner surface of the flow fitting sleeve to provide flow communication from the passages in the plug member to the flow reversing valve. The flow reversing valve permits the flow of hot and cold water entering the flow fitting from the water connection fitting to be reversed, and reverse flow back through the plug member and the water connection fitting to a shower head, for example.

DESCRIPTION OF THE PREFERRED EMBODIMENT

DESCRIPTION OF THE PREFERRED EMBODIMENT

Figure 1:
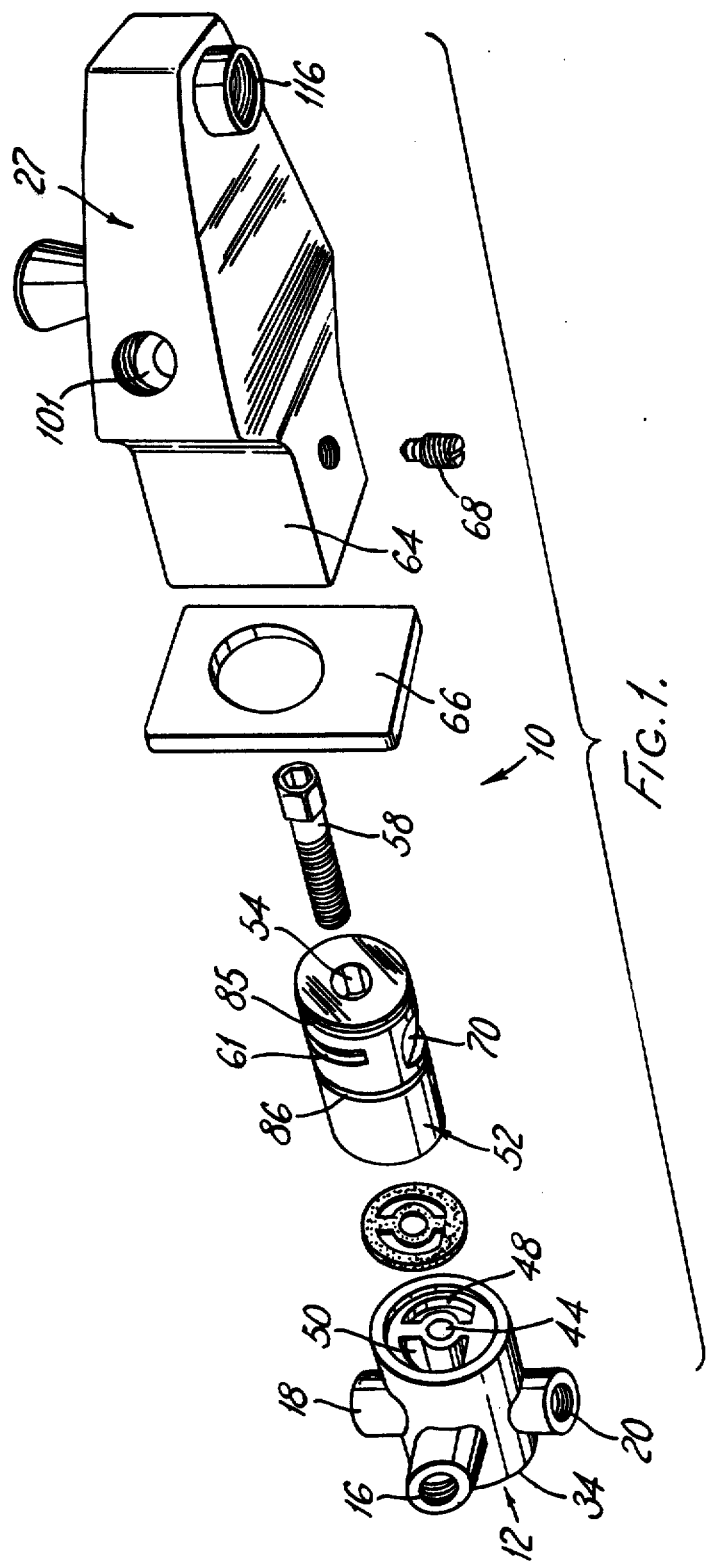
FIG. 1 is an exploded perspective view of the valve assembly of the present invention with the hot and cold water control valves removed.
Figure 2:
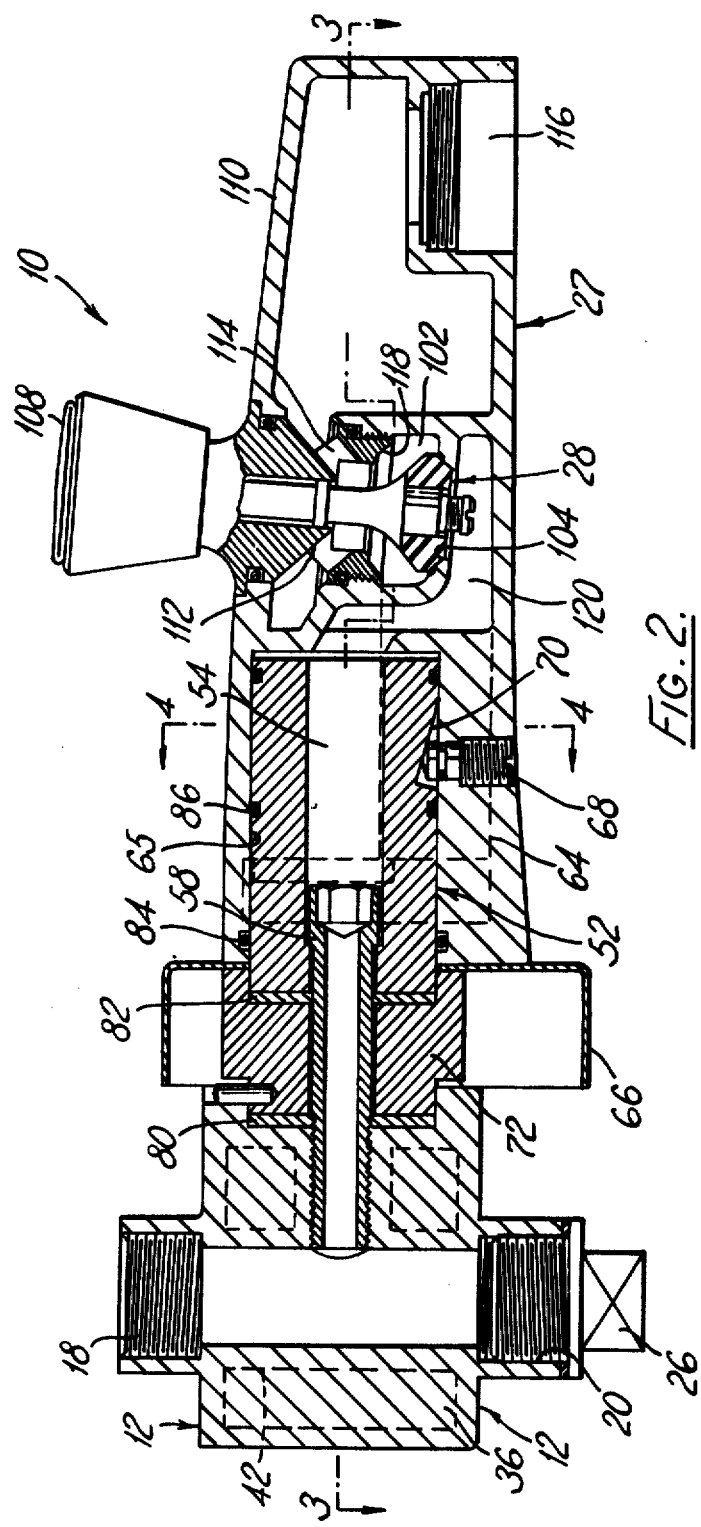
FIG. 2 is a sectional view taken along line 2—2 of FIG. 3 showing the parts of the valve fully assembled.
Figure 3:
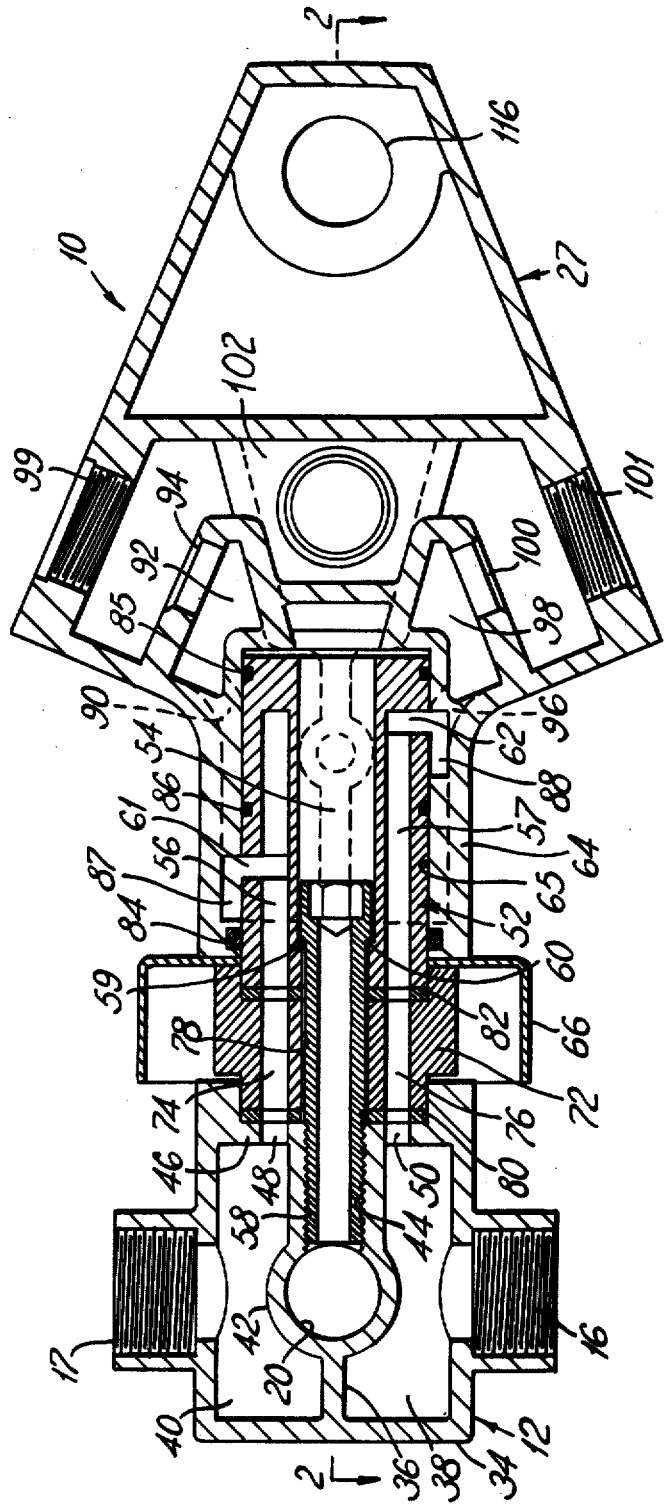
FIG. 3 is a sectional view taken along line 3—3 of FIG. 2.
Figure 4:
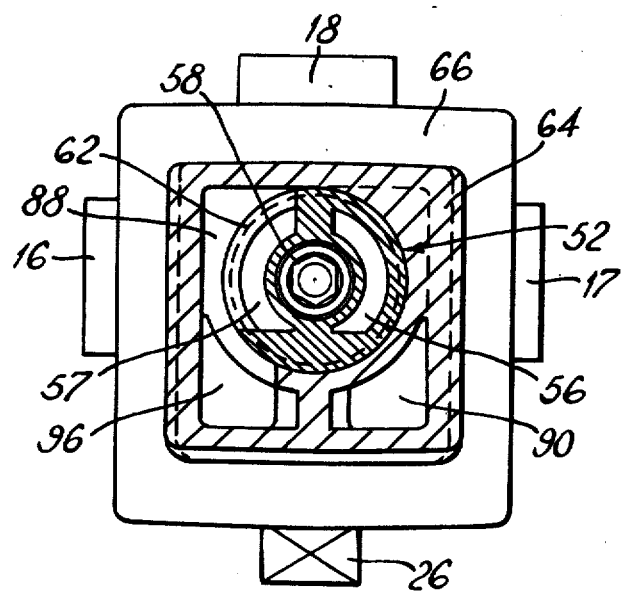
FIG. 4 is a vertical sectional view taken along line 4—4 of FIG. 2.
Figure 5:
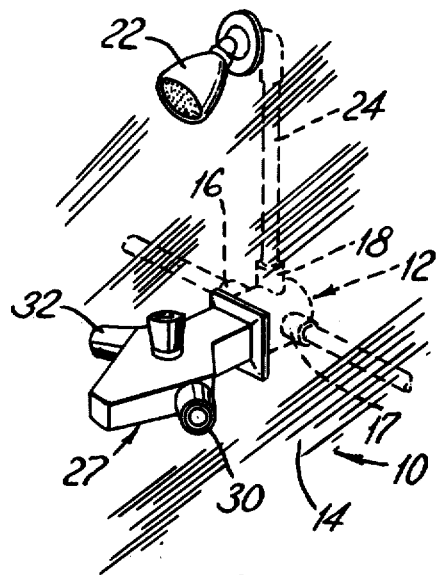
FIG. 5 is a perspective somewhat schematic view of a bath and shower combination employing the valve assembly of the invention.

Referring now to the drawings in detail, wherein like reference characters designated like or corresponding parts throughout the various views, there is illustrated in FIG. 5 the mixing and reversing valve assembly of the invention, generally designated 10. The assembly includes a water connection fitting 12 which is mounted behind a wall surface 14. The connection fitting includes a pair of inlet ports 16 and 17 which are connected to hot and cold water supplies, respectively (not shown). The fitting also includes a pair of outlet ports 18 and 20. It is noted that the ports 16, 17, 18 and 20 are offset from each other at an angle of 90°. Typically, only one of the outlet ports is utilized for return water. For example, the port 18 may be connected to a shower head 22 by means of a concealed pipe 24. In this arrangement, the bottom port 20 is closed by a suitable plug 26 see FIGS. 2 and 4). Alternatively, the top port 18 could be closed by a plug and the bottom port connected to a downwardly extending outlet pipe. Because two aligned outlet ports are provided on the fitting 12, the fitting need not be rotated depending upon the location of the outlet pipe 24. The valve assembly 10 also includes a flow fitting, such as a tub faucet, as shown. A flow reversing valve 28 and a pair of conventional water control valves 30 and 32 are provided on the flow fitting.

The water connection fitting 12 comprises a housing 34 which is divided in half by a rib 36 defining a pair of separate chambers 38 and 40. The inlet port 16 communicates with the chamber 34 while the inlet port 17 communicates with the chamber 40. The rib 36 is formed with an integral hollow cylindrical section 42 which extends between the ports 18 and 20. An outlet opening 44 is also formed in the rib 36 which extends from the cylindrical section 42 to a wall 46 of the connection fitting. Arcuate outlet openings 48 and 50 in the wall 46 communicate with the chambers 40 and 38, respectively. Thus, three openings are provided in the wall 46, the inner opening 44 being provided for return flow of mixed water and the openings 48 and 50 being provided for cold and hot water flow to the flow fitting 27.

A cylindrical surface mountable plug member 52 is provided for bringing the three water lines up to the flow fitting 27. The plug member 52 has a central bore 54 which extends axially therethrough and is aligned with the outlet opening 44 and a pair of peripheral arcuate channels 56 and 57 which are aligned with the arcuate openings 48 and 50, respectively. A hollow screw 58 is threaded into the outlet opening 44 in the water connection fitting 12. The screw has an annular shoulder 59 which engages a shoulder 60 on the wall of the bore 54 to secure the plug member 52 to the connection fitting 12.

The channels 56 and 57 in the plug member 52 are conducted outward through arcuate radially extending openings 61 and 62, respectively, to the surface of the plug member. These openings are spaced axially and are circumferentially offset with respect to each other.

The flow fitting 27 is formed with a sleeve portion 64 having a cylindrical bore 65 therein which slidably receives the cylindrical plug member 52. The flow fitting 27 is in the form of a mixing faucet. A trimming shim 66 may be utilized in mounting the flow fitting onto the wall surface 14. A tapered screw 68 threaded into the wall of the sleeve portion 64 of the fitting 27 is used to tighten and secure the fitting against a wedged face 70 formed on the outer surface of the plug member 52.

An intermediate piece 72 having passages 74, 76 and 78, aligned with the openings 48, 50 and 44, respectively, may be desirable on some occasions for being interposed between the water connection fitting 12 and the plug member 52. Gaskets 80 and 82 may be provided between the intermediate piece 72 and the connection fitting 12 and plug member 52, respectively. It will be understood however that the intermediate piece 72 is optional and not a necessary part of the invention. Shorter or longer intermediate pieces may be used if a greater distance of the tub from the wall is required, etc. If the intermediate piece is used, the central hollow screw 58 must of course be lengthened by the length of the intermediate piece and the thickness of the gaskets 80 and 82.

The sleeve portion 64, which is mold-cast as a connection for the flow fitting 27, is sealed outwardly by means of an O-ring 84 and inwardly by means of a second O-ring 85. Such O-rings are adjacent to the opposite ends of the plug member 52. A third O-ring 86 is located between the radial openings 61 and 62.

The sleeve portion 64 is formed with two diametrically opposed cavities 87 and 88 in its inner surface which are located so that they communicate with the radial openings 61 and 62, respectively. An axially extending groove 90 in the inner surface of the sleeve portion 62 extends from the cavity 87 into a chamber 92 beneath a valve seat 94. A second axially extending passage 96 extends from the cavity 88 to a second chamber 98 underneath a second valve seat 100. The water control valves 30 and 32 (seen in FIG. 5) control the flow of water through the valve seats 94 and 100. The valves 30 and 32 extend through holes 99 and 101 in the sides of the fitting 27. Cold and hot water flowing through the seats 94 and 100 mix within a chamber 102, seen in FIG. 2, located above a third valve seat 104. This valve seat is controlled by the flow reversing valve 28 having a handle 108 which extends from the upper surface 110 of the flow fitting 27. The hot and cold water leave the chamber 102 through a passage in a fourth valve seat 118 and flow from the chamber through passages 112 and 114 114 into the tub outlet 116 at the end of the flow fitting. If the reversing valve handle 108 is lifted, the tub outlet is closed by virtue of engagement of the valve 28 with a valve seat 118. The mixed water will then flow through valve seat 104 and a diversion passage 120 into the central bore 54 of the plug member 52, and from there through the central hollow screw 58 into the water connection fitting 12, through the top port 18 for transmission via the pipe 24 to the shower head 22.

Thus, the flow fitting or tub mixing faucet 27 is completely surface mounted with the help of the concealed water connection fitting 12 and cylindrical plug member 52 of the present invention, and concealed return pipe 24 permits return of mixed water to the shower head 22. It will be appreciated of course that the valve assembly of the present invention may be used for connecting other flow fittings in the sanitary environment, such as kitchen and washing-up table faucets.

What is claimed is:

1. A mixing and reversing valve assembly for use in bath and shower combinations, or similar arrangements, comprising:
   a concealed water connection fitting adapted to be mounted behind a wall surface including a pair of separate chambers, inlet ports communicating with said chambers adapted to be connected to hot and cold water supplies, respectively, and an outlet port for mixed return water;
   a wall of said fitting having a pair of outlet openings each communicating with one of said chambers and a third opening communicating with said outlet port;
   a cylindrical surface mountable plug member adjacent to said wall having three passages therethrough, one end of two of said passages being aligned with said pair of outlet openings, respectively, and one end of said third passage being aligned with said third opening;
   means attaching said plug member to said wall;
   a flow fitting having an outlet and a sleeve portion having a cylindrical bore therein slidably receiving said plug member;
   flow reversing valve means in said flow fitting movable between first and second positions;
   means in said flow fitting providing flow communication from the other ends of said passages in said plug member to said flow reversing valve means;
   in said first position, said flow reversing valve means allowing water to flow from said chambers in said water connection fitting through said two passages to said flow fitting outlet; and
   in said second position, said flow reversing valve means allowing water from said two passages to flow reversely back through said third passage to said outlet port of said water connection fitting.

2. A valve assembly as set forth in claim 1 wherein: said third passage includes a central bore in said plug member; and
said attaching means comprises a hollow cylindrical screw mounted coaxially within said bore and threadably engaged with said outlet port of said fitting.

3. A valve assembly as set forth in claim 1 wherein: said two passages include a pair of bores positioned adjacent to the periphery of said plug member; and
said third passage is coaxial with the axis of said plug member.

4. A valve assembly as set forth in claim 3 wherein: said two passages also include a pair of radial openings extending from said bores to the outer surface of said plug member, said radial openings being circumferentially offset from each other;

said radial openings being spaced axially from each other; and said flow communication providing means in said flow fitting including axially extending grooves in the inner surface of said sleeve portion aligned with said radial openings, respectively.

5. A valve assembly as set forth in claim 4 including:

annular resilient sealing elements disposed between said plug member and said sleeve, and said sealing elements being located between said radial openings and adjacent to the ends of said plug member.

6. A valve assembly as set forth in claim 1 including:

a wedge face in the outer surface of said plug member; and screw means in said sleeve engaging said wedge face to fix said flow fitting axially relative to said plug member.

* * * * *